United States Patent [19]
Hammond

[11] Patent Number: 5,479,487
[45] Date of Patent: Dec. 26, 1995

[54] CALLING CENTER EMPLOYING UNIFIED CONTROL SYSTEM

[75] Inventor: Daniel D. Hammond, Dallas, Tex.

[73] Assignee: InterVoice Limited Partnership, Reno, Nev.

[21] Appl. No.: 16,740

[22] Filed: Feb. 11, 1993

[51] Int. Cl.$^6$ .............................. H04M 1/64; H04M 3/00
[52] U.S. Cl. .................. 379/67; 379/89; 379/96; 379/210; 379/212; 379/265
[58] Field of Search .................. 379/67, 88, 89, 379/265, 266, 210, 211, 212, 96

[56] References Cited

U.S. PATENT DOCUMENTS

| | | | |
|---|---|---|---|
| 4,797,911 | 1/1989 | Szlam et al. | 379/67 |
| 4,837,798 | 6/1989 | Cohen et al. | 379/396 |
| 4,894,857 | 1/1990 | Szlam et al. | 379/67 |
| 4,942,602 | 7/1990 | Baker, Jr. et al. | 379/212 |
| 5,008,930 | 4/1991 | Gawrys et al. | 379/210 |
| 5,012,512 | 4/1991 | Basso et al. | 379/265 X |
| 5,164,981 | 11/1992 | Mitchell et al. | 379/212 X |
| 5,167,011 | 11/1992 | Priest | 395/54 |
| 5,179,585 | 1/1993 | MacMillan et al. | 379/88 |
| 5,181,162 | 1/1993 | Smith et al. | 364/419 |
| 5,187,735 | 2/1993 | Herrero Garcia et al. | 379/211 X |
| 5,214,688 | 5/1993 | Szlam et al. | 379/67 |

*Primary Examiner*—Jeffery A. Hofsass
*Assistant Examiner*—Daniel S. Hunter
*Attorney, Agent, or Firm*—Fulbright & Jaworski

[57] ABSTRACT

An integrated telephone call handling system and method are disclosed. The system comprises a unified software control for controlling a call between the system and a party, the unified control capable of transferring the call among functional partitions within the system, the functional partitions providing mechanized communication via the network and capable of directing communications between the party and a selected one of the functional partitions. The unified control includes a unified script language to allow unified scripting of a call from inception to termination, including scripting of interaction between the party and an agent.

43 Claims, 2 Drawing Sheets

CALLING CENTER EMPLOYING UNIFIED CONTROL SYSTEM

CROSS-REFERENCE TO RELATED APPLICATIONS

U.S. patent application Ser. No. 08/016,062, directed to a "Method and Systems for Unified Voice Telephone Services" and filed on even date herewith is hereby incorporated by reference.

TECHNICAL FIELD OF THE INVENTION

This invention relates in general to agent-based telephone communication systems and more particularly to a computer-based system architecture that allows integration of voice, text, image and call processing with an agent-based call center, all under control of a single, unified software control system.

BACKGROUND OF THE INVENTION

Over the years, various systems have been developed to operate in conjunction with public and private switching telephone networks to provide specialized functions that lend power, versatility and efficiency to telecommunications.

These various systems are designed to operate on data in one or more of three general categories: voice, text and image. Together, these types of data encompass all data currently desired to be processed or transmitted in communication systems.

The above-described data can be processed or communicated in ways that can be generally categorized as "mail" (also termed "store and forward"), "interactive" and "bulletin" systems. Mail systems allow a user to retrieve voice, text or images that have been exclusively addressed to the user. In such mail systems, it is typical to require the user to enter a unique password to gain access to the exclusively-addressed data. Interactive systems allow a user to control what data the interactive system delivers to the user, and, perhaps, in what order the data is delivered. Unlike mail systems, however, the data need not be exclusively-addressed, and thus can be publicly available. Lastly, bulletin systems allow a user to retrieve publicly available information in a non-interactive, system-controlled fashion.

One type of system directed to handling of data is automatic call distribution ("ACD"), wherein a pool of agents is assigned to answer calls incoming on a particular group of telephone lines. ACD systems handle these calls as they arrive, assigning them to agents in the order received and choosing the agents based on length of idle time. This algorithm of queueing is called "fair queueing." Because human agents are present, such ACD systems are interactive.

Another such system is audio text (or "audio tex"). Audio text system are designed to "play" a message stored in a memory device to a person listening on the other end of the call. These systems are generally not interactive and can be bulletin systems.

Yet another such system is a modem pool. Modem pool systems function in a manner similar to ACD systems. As a plurality of computers make incoming calls to a central pool of modems, typically attached to a single, large, general-purpose computer, the modem pool system assigns the incoming calls in a "fair queueing" manner. Such systems are also typically interactive.

Still another such system is a predictive dialer. Predictive dialers are used in outbound calling applications and typically in conjunction with a pool of agents. Predictive dialers employ statistical techniques to predict the length of time, on average, agents take to handle calls. These dialers further gather statistics regarding the average time required to successfully connect an outbound call. The dialers use these averages and data pertaining to agent availability to place calls from a list of numbers to be dialed, employing their predictive ability to maximize agent utilization. These systems can be mail, interactive or bulletin.

Another such system is voice mail. Voice mail allows callers to leave voice messages with those called. Voice mail systems typically play greeting messages recorded by the called parties, record the time and origin of received messages and allow for callers to exit the system to speak with a human, if desired. Obviously, voice mail systems are categorized as mail systems.

Another such system is facsimile ("fax"). This ubiquitous system has exploded onto the marketplace in recent years and, as is nearly universally understood, gives one the capability to send paper-borne images by telephone. Such systems are image-based and can be implemented as mail, interactive or bulletin systems.

Other image-based systems are adapted to handle graphics or moving images (video). As with fax, these graphics or moving image systems can be mail, interactive or bulletin.

Still another system to be described is automatic number identification ("ANI") systems. These systems are designed to take inbound calls and detect special signals delivered from a central office indicating the phone number of the calling party. Since the signals can uniquely identify the calling party, the call can then be routed to a specific agent or interactive voice response ("IVR") application able to handle that caller, based upon caller identification.

As useful and desirable as these individual systems are, they have always been thought of as independent systems that, at best, adhere to a common protocol for interface and data interchange, allowing them to be attached to and cooperate with, telephone systems, either separately or in combination. However, it should be understood that, in any case, these systems do not cooperate in any fashion apart from superficial connectivity via industry standard telephony connections. Some manufacturers who happen to make more than one type of system may provide a proprietary interface or protocol between systems, but these proprietary links are just that: cooperation at a connectivity level.

Computer technology has worked itself into telephony as effectively as it has in so many other areas. Accordingly, over the years, the above-described systems have moved from the analog to the digital domain, employing digital processors, memory, digital storage media, data and address buses and the like. As it is, each of these systems stands alone, each having its own computer hardware and software. A person wishing to use two systems together must live with the fact that the systems have independent hardware and software.

Another disadvantage of the separate nature of the systems is that each collects call routing and other control data, including data collected during the course of its interaction with a party during a particular call. For instance, assume a system allowing for both ACD and voice mail such that incoming callers may choose to leave a message if all agents are busy. As a particular call begins, the ACD system elicits information from the caller pertaining to the reason for the call. Using dual tone multi-frequency ("DTMF"), ANI or voice recognition, the ACD system captures and stores this information to direct the call to the proper agent or to prompt an agent ahead of time as to what is needed.

The caller, however, may grow weary of waiting and wishes to exit the ACD queue. The ACD system allows for this by providing for an exit upon receipt of a particular tone. However, upon successfully exiting the ACD queue, the caller is once again prompted to supply the very same information to the voice mail system to thereby allow the voice mail system to collect the needed information. The caller has had to give the same information twice, owing to the lack of coordination between the systems.

Of course, if the systems are supplied by the same manufacturer, proprietary interfaces and protocols may allow transfer of the information. But even if this disadvantage is overcome, the systems still duplicate hardware and software. As a particular application demands more and more functions, the problems of integrating the various necessary systems become more acute and perplexing.

Other problems abound. These systems, because they stand alone, have separate maintenance consoles and control languages. The systems must be interconnected by cables that, as the number of cables grows, increases the chances of failure. The loose connectivity of these systems limits rates of data transfer between the systems. In fact, adjunct switching matrices are frequently required to perform ancillary switching tasks that would overload the main switching system, typically a private branch exchange ("PBX").

These systems frequently offer the option of providing reports and statistics concerning their operation. These reports and statistics are frequently incompatible and difficult to integrate. Most often, there is simply no one place from which to obtain reports and statistics. Because of the duplication of hardware and software, these systems are difficult to manage, they are larger and more costly than necessary, and they consume more power and produce more heat than is optimal. In short, integration of these various systems has been a long felt need in the art, but one that, thus far, has been met with dissatisfaction.

Unfortunately, the prior art has failed to provide an effective means by which to integrate these systems under unified software control, allowing them to share information and resources among themselves in a cost and time efficient manner.

The above-mentioned U.S. patent application Ser. No. 08/016,062, entitled "Method and Systems for Unified Voice Telephone Services" and filed on Feb. 10, 1993, is directed to a unified system for handling voice, text and image data in a plurality of "functional partitions," each of which corresponds to one of the heretofore separate systems described above. That unified system is capable of interfacing with a telephone exchange via an integrated call-processing partition.

Since the mid-1970s, more and more companies have taken advantage of interactive voice response ("IVR") systems to automate, and thereby reduce the cost of, providing information to their customers, employees and others.

IVR is actually an extension of audio text systems. An IVR system allows callers to access computer-resident data such as account balances or stock prices through a standard telephone. The IVR system allows the caller to query for data using touch-tone signals, and the result is returned as spoken words. Again, it is obvious that such systems are interactive and can be mail.

These IVR systems have typically handled from 30% to 70% of incoming calls, with the remaining calls being transferred to live operators. When the calls reach the operators, the callers have generally already identified themselves by touch-tone entry of their account number as well as a security code, perhaps as part of an interactive session wherein, for instance, the caller has obtained a balance of a checking account. As previously mentioned, customers justifiably find it aggravating and time consuming to have to re-identify themselves for the agent and then wait for the agent to request information from the host database. Companies that manufacture private branch exchange/automatic call distribution ("PBX/ACD") systems have sought for years to solve this problem by developing interfaces that allow the host application to better integrate the voice, text and image data components of the call. While these measures do provide a means of solving the problem, there are several significant drawbacks to the solution.

The first problem is that the host (or workstation) application must be modified to take full advantage of the PBX/ACD. Many companies have large sums of money invested in their host application and thus, even if they had sufficient staff to make such modifications, they are disinclined to do so.

The second problem is that each PBX/ACD company has its own proprietary host communication link. While there are products, such as IBM's CallPath SwitchServer/2, that abstract differences between telephone or communication link switches, all switches do not support all of the same functions. This means that the host software must still, in many cases, be configured to communicate with each type of switch being used, often requiring different switch drivers to take advantage of each switch's functionality.

The third problem is cost. Current solutions require purchase of high-priced software for both the host computer (or workstations) as well as a high-priced software module for the PBX/ACD. Even after purchase of all this software, there remains the expense of writing host or workstation software to create a solution.

The fourth and possibly most significant problem is the complexity of the solution. One must acquire expertise in 1) the host software, 2) the PBX/ACD software, 3) the IVR software and 4) the voice mail software and then attempt to make it all work together well enough for the system to appear "seamless" to callers.

Clearly, a solution is needed that does not require any changes to the host computer or PBX software and provides a cost effective, single application software environment for controlling calls from start to finish regardless of what is required by the caller.

U.S. Pat. No. 4,797,911, which issued on Jan. 10, 1989, to Szlam et al., discloses a method and apparatus for relieving the agent of the duty of obtaining preliminary caller account information by automatically querying a host database at the beginning of a call. Szlam et al. also provide for on-line, direct updating of the caller account information in the host computer, thereby eliminating the need for consolidation of changes into the caller account file. This provides the agent with the most current information on the caller account. More particularly, Szlam et al. provide an apparatus that automatically dials the telephone number of the caller or potential caller, ascertains the status of the called number and, if the call is answered, routes the call to the next available agent and automatically obtains the current caller account information from the mainframe and displays, at the agent's terminal, the current caller account information. The apparatus also provides for automatic answering and routing of incoming calls to the next available agent along with caller account information retrieved from the mainframe.

U.S. Pat. No. 4,894,857, which issued on Jan. 16, 1990, to Szlam et al., is a continuation-in-part of the Szlam et al. patent described above and provides for a similar method and apparatus for retrofitting and extending or upgrading an existing caller account servicing system to provide for automated handling and processing of both incoming and outgoing calls. The system controller and terminals use the same command and data format structure as that already in use by the existing system and software of the mainframe. The system controller is transparent to the operation of the mainframe and the agent terminals and allows the system to be upgraded without the necessity of purchasing different software or programs for the mainframe.

As mentioned above, the prior art has taken a piecemeal approach to voice, text, image and call processing systems, preferring to treat them as separate and distinct. In limited cases, particularly as illustrated in the patents to Szlam et al., integration of data and call processing systems has been limited to superficial cooperation at a communications protocol level. The prior art has unfortunately failed to provide a seamless, fully integrated voice-, text-and image-based system specifically designed to operate in conjunction with live agents to produce thereby a calling center that is able to be configured to function as a mail, interactive or bulletin system and is adaptable to a wide range of applications without requiring modification of either hardware of software.

SUMMARY OF THE INVENTION

The present invention solves the foregoing problems and is directed to an improved call center configured as an integrated voice, text and image communication system and providing for automated processing of inbound and outbound telephone calls. A key point of novelty of the present invention is its ability to connect callers to live agents when necessary, all the while retaining unified software control of the interaction between caller and agent via an agent script. As such, the present invention is the first to treat interaction with live agents as simply another type of functional partition.

Therefore, it is a primary object of the present invention to provide an integrated telephone call handling system adapted to be coupled to (1) a telephone network to enable the system to communicate via the network, (2) an agent workstation to enable an agent to communicate with the system and (3) an agent telephone to enable the agent to communicate with a party via the system and the network. The system is controlled by a unified software system comprising a system for controlling a call between the system and the party, the unified controlling system capable of (1) transferring the call among functional partitions within the system, the functional partitions providing mechanized communication via the network and (2) directing communications between the party and a selected one of the functional partitions.

One of the most powerful advantages realized by providing such an integrated system for handling calls and data is the ability to use a unified script language to thereby allow unified scripting of a call from inception to termination, including scripting of interactions between a party and an agent. Accordingly, the present invention provides for a first script for directing interaction between the system and the party and a second script for directing interaction between the system and the agent. Thus, the present invention is the first to provide for a way of scripting interactions with a live agent, thus treating the live agent as just another functional partition. In a preferred embodiment, the first script and the second script are able to communicate information between one another, all under common control.

Another major advantage realized by integration of heretofore separate call handling functions is integration of record-keeping during a particular call. Accordingly, it is another object of the present invention to provide a system further comprising means for creating a single record containing data gathered during a single call session and means for storing data pertaining to the single call session in the single record throughout a duration of the call, the data gathered from a plurality of functional partitions within the system to thereby eliminate a need to gather a particular datum multiple times during the single call. Unified scripting facilitates creation and maintenance of the single record. The record can contain data received from the caller or data generated by the system, including its various functional partitions and any database. These single records can be cross-referenced to one another to thereby create a meta-record of an entire transaction with a particular caller, allowing auditing and reporting of the entire transaction, rather than of just single calls within the transaction.

In its preferred embodiment, the system of the present invention comprises an agent workstation coupled to the system, the workstation permitting communication between the agent and the system. This permits the agent to view portions of the call record to allow the agent to more effectively and efficiently serve the caller's needs. This also allows the agent to access data contained in a central database, existing as either part of the system itself, or as an external host database.

As previously mentioned, the system of the present invention can be configured to communicate with callers in one or more of several system modes, depending upon the particular application. First, the system can operate as a mail system, wherein the system presents information intended for delivery to a particular caller to the particular caller (store and forward). Second, the system can act as an interactive system, wherein the system presents information to a caller in a manner determined by the caller (perhaps as part of an IVR). Finally, the system can be configured as a bulletin system, wherein the system presents information to caller in a predetermined manner (perhaps as part of an audio text system).

The preferred environment for operation of the present invention is a communications system having (1) an agent for communicating with inquiring parties, (2) a database of information pertaining to accounts of the parties and (3) call completion capability for terminating calls to a plurality of different call terminations, the terminations including automated data response for obtaining information from a selected one of the accounts. In that environment, the present invention provides for a control unit for answering calls from the inquiring parties and for directing any of the calls to a selected one of the call terminations, comprising (1) means for (a) interactively communicating with one of the parties to determine which call termination is required, (b) establishing a first call termination with respect to the one of the parties and (c) transferring to the first call termination any data obtained with respect to the one of the parties. The invention further provides (2) means for continuing to monitor established communication connections to permit modification of the first call termination when the one of the parties desires connection to a second call termination and (3) means for transferring to the second call termination the any data obtained with respect to the one of the parties and any data obtained during the first call termination.

Typically, the first call termination is a data response and the second call termination is to the agent. The system further including means, associated with the agent, for providing selected account information to the agent when the agent becomes connected to the one of the parties and the communicating means includes means for providing a preselected portion of the one of the parties's account data to the agent concurrent with the transferring of the second call termination to the agent, the preselected portion including a portion of the any data obtained with respect to the one of the parties. The monitoring means further includes means for modifying a call termination at a direction of the one of the parties or any call termination.

The present invention also includes methods of operation of such systems.

In a typical application, incoming callers are provided typical account information in a VRU script that has been programed into the system. When a caller requests a live agent, such as by pressing "0" on a touchtone telephone pad, the caller is routed to an ACD that allows calls to be held pending agent availability. The ACD can provide selected call-back when an agent becomes available or at a specific future time. When an agent becomes available, the call is connected and the caller's host computer session is immediately switched to the agent's workstation screen so that the selected agent can answer the call armed with specific information pertaining to the caller.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiment disclosed may be readily used as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
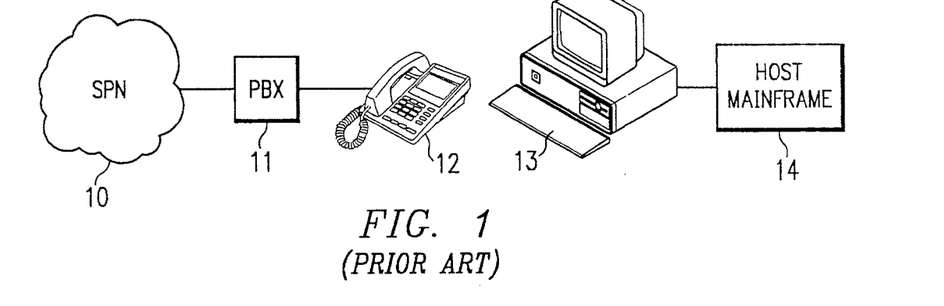
FIG. 1 illustrates a prior art method for servicing callers.

Referring to FIG. 1, illustrated is a prior art system for servicing of caller accounts on either an incoming or outgoing basis. The system is comprised of PBX 11 attached to subscriber public network 10. A caller account representative, or agent, will employ telephone 12, that is connected to PBX 11, and data terminal 13, that is connected to host mainframe Host 14 contains a database of caller account information.

In this system, customers calls from public network 10 are received by PBX 11 and subsequently transferred to telephone 12 so that the caller account representative may speak with the caller. The caller account representative will access caller account information from host 14 through data terminal 13.

The caller account representative may also place outgoing calls to public network 10 through PBX 11. In performing this task, the agent must manually retrieve caller account information from host 14 through terminal 13 and manually dial on telephone 12 the caller's telephone number and wait for the caller to answer. Of course, there may be a plurality of agents with data terminals connected to host 14 and telephones connected to PBX 11 in order to receive and place telephone calls to customers.

Figure 2:
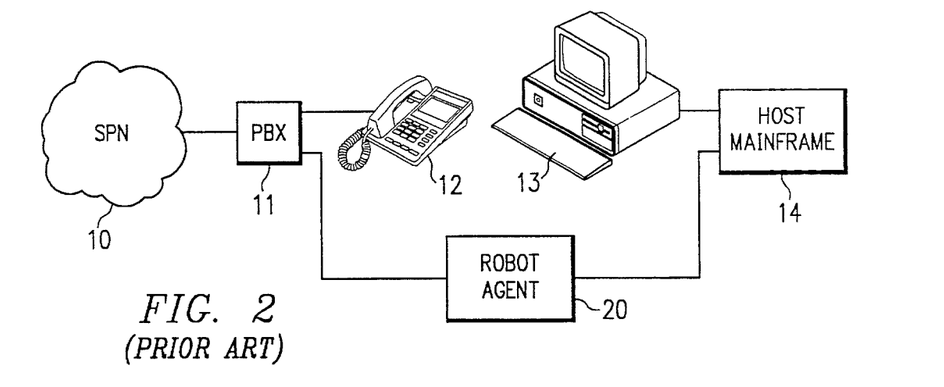
FIG. 2 illustrates a prior art method for automatically servicing callers.

Referring next to FIG. 2, there is shown the next evolution in systems for servicing caller accounts. In this improved version, robot agent 20 is also placed between PBX 11 and host mainframe 14. Now, when an incoming call from public network 10 is received by PBX 11, it is initially transferred to robot agent 20 that controls an IVR for interacting with the caller according to a predefined script programed within robot agent 20. The result is that the caller may converse with robot agent 20 using his touchtone keypad on his telephone for responding to requests by robot agent 20. The caller is thereby allowed to access a menu of options including entering his account identification number. Robot agent 20 uses this account identification number and other information retrieved from the caller to access the caller's account in host mainframe 14. The result is that the caller, using his touchtone keypad, may access account information from host mainframe 14 through robot agent 20 without ever having to speak to a live agent.

Robot agent 20 may also have a voice recognition unit that allows a caller to simply speak his requests and responses to the voice recognition unit that uses this information when accessing host mainframe 14.

Robot agent 20 has the capability to transfer the caller to a live agent if the caller is using a rotary telephone and is thus unable to enter information with a touchtone keypad, or robot agent 20 has the ability to transfer the caller to a live agent at the caller's request, such as when the caller enters on his touchtone keypad a menu option requesting a live agent. In these instances, robot agent 20 will essentially place a transfer of the call through PBX 11 to telephone 12.

The problem with such a system is that any caller information retrieved by robot agent 20 is not passed to data terminal 13 when the call is transferred to telephone 12. The caller is then required to again provide caller account information to the live agent at data terminal 13 so that he may request the caller account information from host mainframe 14.

Figure 3:
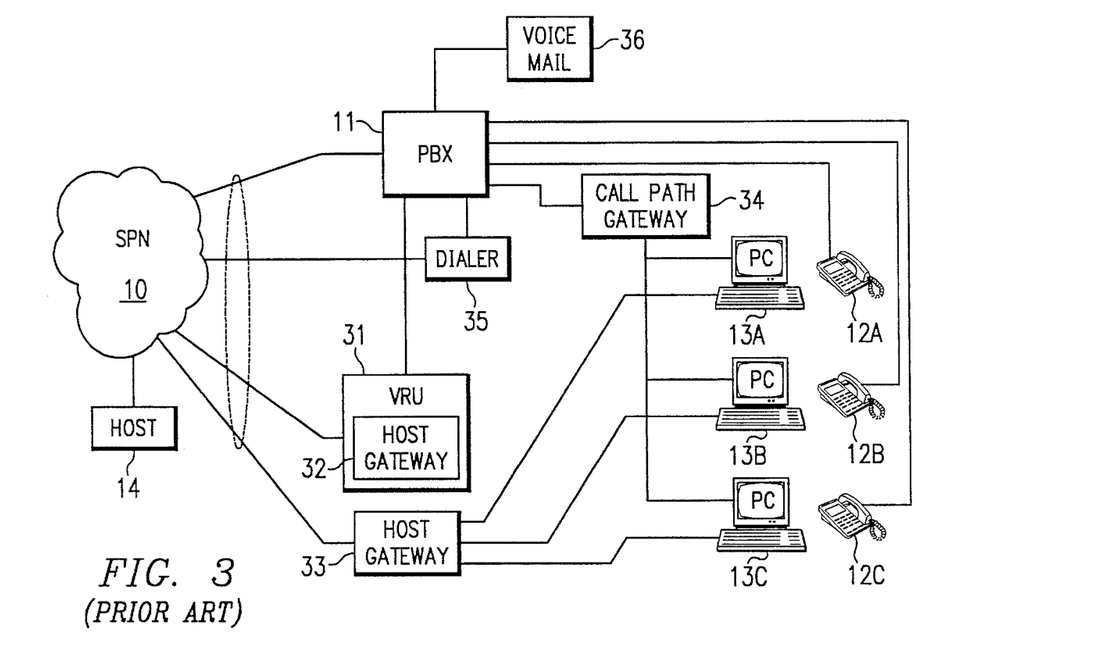
FIG. 3 illustrates a prior art conventional call center.

In another embodiment of this prior system, shown in FIG. 3, host 14 may be coupled to the system through public network 10. In this system, a call coming from public network 10 into PBX 11 will be transferred to a voice response unit ("VRU") 31 that uses host gateway 32 to connect to host 14 through public network 10 in order to access caller account information within host 14. If the caller wishes to speak to a live agent, the call will be transferred from VRU 31 through PBX 11 to one of telephones 12A, 12B or 12C at caller stations 13A, 13B or 13C, respectively. For example, the call could be transferred to telephone 12A. Simultaneously, a "short screen" of information received by VRU 31 from the caller is sent through PBX and gateway 34 to terminal 13A, that subsequently establishes a data link with host 14 through gateway 33. The agent will then use terminal 13A to access caller account information within host 14.

Outbound calls may also be placed by an agent at one of the workstations. Dialer 35 may be used to automatically call customers through public network 10, which calls will be answered by VRU 31 as previously described. If necessary, the call may be transferred to a live agent in the manner previously described.

A caller may also request that a transfer be made to voice mail 36 in order to leave a message for a particular party if a live agent is not available.

In both incoming and outgoing processes, VRU 31 may transfer a short screen of information to the data terminals while transferring the caller to one of the live agents. The data terminals will then request the full caller account information through host gateway 33.

It should be noted that the above-described systems all require several separate pieces of hardware and equipment in order to implement such a system. Additionally, once the call is transferred to a live agent, the call ends there and may not be transferred back to VRU 31 or any other function or resource such as another agent, a facsimile card, a modem, audio text, etc.

Figure 4:
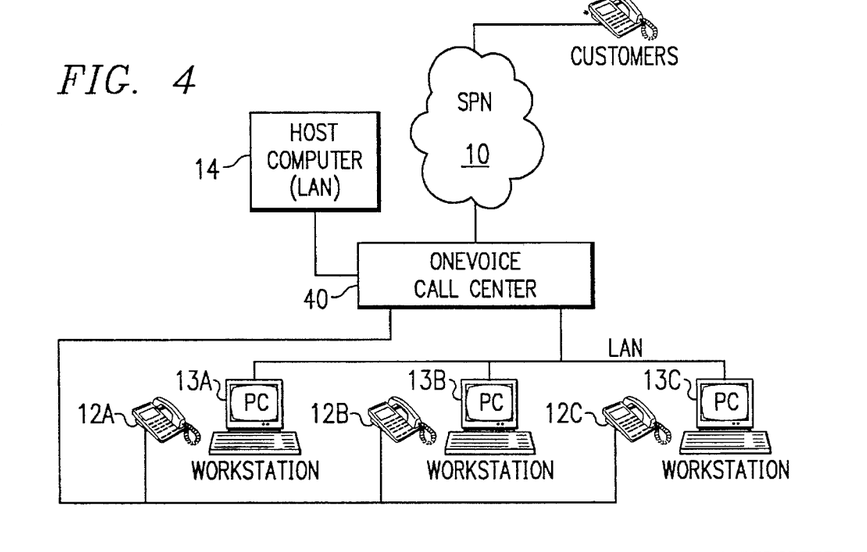
FIG. 4 illustrates a call center according to the present invention.

Referring next to FIG. 4, there is shown an integrated voice, text and image data automation system of the present invention providing all the functionality needed to automate processing of inbound and outbound telephone calls including connecting callers to robot agents or live agents. Call center 40 is physically connected to workstations 13A, 13B and 13C via LAN and to agent telephones 12A, 12B and 12C either directly or via an existing PBX (not shown). Call center is also shown directly connected to host computer 14, that may be a group of computers interconnected via LAN. Call center 40 does not require software changes in the host or PBX for integrations. Call center 40 is also connected to public network 10 that provides interconnections to caller telephones 41. Host 14 may be connected to call center 40 through public network 10 (connection not shown).

Figure 5:
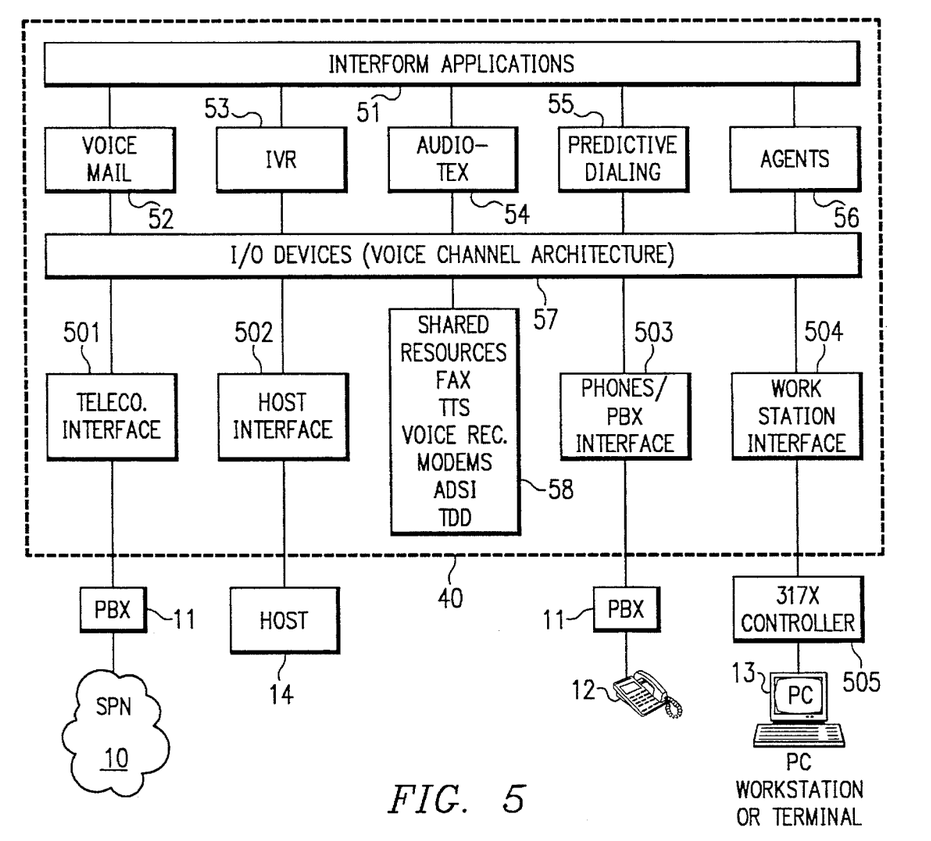
FIG. 5 illustrates a system architecture of the present invention.

Referring next to FIG. 5, there is shown a typical implementation of the present invention. Applications manager 51 manages the various resources available within call center 40.

IVR 53 allows all caller calls or DNIS/DID-directed calls to enter an IVR script upon answer. This script may be a standard package or a caller defined application. As an example, a call from a caller originating within public network 10 will be received by telco interface 501 within call center Alternatively, call center 40 may be connected to public network 10 through PBX 11.

The caller call arriving at interface 501 is transferred through voice channel architecture 57 to IVR 53 for interaction with the caller. The caller may interact with IVR 53 for retrieving information on the caller's account and also access any other information that IVR 53 is configured to offer. At times, IVR 53 may request information from host 14 through architecture 57 and host interface 502. This retrieved information may then be transferred to the caller.

As previously described, IVR 53 may provide a menu of options to the call, who may choose from this menu by pressing digits on his touchtone keypad.

Calling center 40 also has the capability for allowing callers to receive requested information via fax. For example, while the caller is interacting with IVR 53, the caller may request that a facsimile of desired information be faxed to a caller provided telephone number. This option may be provided by IVR 53 via a menu option selectable by the caller using his touchtone telephone keypad. In such a situation, IVR 53 will retrieve the caller requested information from host 14 in the manner previously described and transfer this information over voice channel architecture 57 to shared resources block 58 that includes the fax functionality of call center 40. At the caller's direction, IVR 53 will also transfer over architecture 57 to block 58 the telephone number of the receiving facsimile machine at the caller's premises. This transfer of information to block 58 by IVR 53 may be accomplished while IVR 53 is still conducting an interactive conversation with the caller or after IVR 53 has completed an interactive communication with the caller whereby the facsimile functionality within block 58 will fax the requested information through voice channel architecture 57 and telco interface 501 to public network 10 wherein the caller's receiving facsimile machine is located.

Call center 40 may also provide a voice mail system for allowing caller callers to leave messages to a particular person, such as a caller representative agent when no agents are available. In such an instance, IVR 53 may provide an option to the caller to be transferred to voice mail 52 in order to leave a message. This option may be selected by the caller by pressing a particular digit on his touchtone keypad. At that instance, IVR 53 will transfer the call over voice channel architecture 57 to voice mail 52, which will then interact with the caller.

If IVR 53 recognizes that the caller does not have the use of a touchtone telephone, IVR 53 may transfer the call through voice channel architecture 57 to block 58 that contains voice recognition functionality whereby the same menu options and procedures offered by IVR 53 are offered with voice recognition capabilities so that a caller may merely speak responses to inquiries as opposed to entering the responses with a touchtone keypad. A caller using a rotary phone may also be transferred to a live agent in a manner to be described.

If the caller has a computer (not shown) and wishes to interface with call center 40 using that computer, IVR 53 may transfer the call through voice channel architecture 57 to block 58 that has a modem for interfacing with the caller's computer in basically the same manner as IVR 53 interacts with the caller's person. Menu options are supplied to the caller through his computer display, and the caller enters responses using his computer keyboard.

If the caller is hearing impaired and has access to a telephone device for the deaf ("TDD"), IVR 53 will transfer the caller through voice channel architecture 57 to block 58 that also contains the capability of interacting with a TDD in the same manner that the modem interacts with a caller's computer.

Call center 40 contains the ability to transfer the caller to a live agent when one is requested, such as when the caller presses 0 on his touchtone keypad. When a live agent is requested, the caller is placed in an automatic call distribution ("ACD") smart queue within agent's controller module 56 that allows holding or selecting a call back when an agent is available or at a specific future time. Callers are provided the estimated hold time and given the option of remaining in queue or specifying a later call back. Additionally, calls may be directed to live agents using DNIS or DID to agent ACD groups with an optional prompt for account number to allow automatic host access prior to connection to an agent. Calls to specific extensions may be made and voice mail 52 may be accessed if all agents are busy or there is a ring no-answer when an agent is requested. A "short screen" containing data obtained by the initial IVR script may be displayed for the agent while the host is retrieving the full record. The call center then makes a voice, text and image data connection to the live agent.

The call center supports dialing out from caller lists using a pacing algorithm. When an answer occurs, an agent is selected, and an IVR script displays a "short screen" and requests the full record from the host system.

An agent may transfer a call to another agent or supervisor. This is handled by the call center IVR script in the same manner as a transfer from the initial IVR script to the ACD queue, establishing a voice, text and image data session for the recipient of the call.

The call center supports transferring calls to other remote locations by selecting an outbound trunk line and dialing another location using a DNIS that activates an IVR script on the receiving end of the call. The caller's identification is passed to the receiving end IVR script that, in turn, establishes a host session for a local agent. The initial call center location then holds up the voice connection until the call is completed.

The call center supports conferencing-in another agent or supervisor, with voice, text and image data available to both operators.

A live agent uses workstation 13 connected to call center 40 through workstation interface 504 and optional 317X controller 505, if needed. Workstation 13 is used to access host 14.

The live agent also uses telephone 12 that is connected to call center 40 with phones/PBX interface 503. The phones may be directly connected to interface 503 or through optional PBX 11.

If a caller requests a live agent, IVR 53 will transfer the call through voice channel architecture 57 to agent's controller module 56 to be placed in an ACD queue. Once a live agent is available, the caller will be switched through voice channel architecture 57 to interface 503 and phone 12. At that time, agent's controller module 56 may send a short screen of information through architecture 57 and interface 504 to workstation 13 in order that the live agent may have immediate access to the caller's account number and other brief information that has been given to IVR 53 by the caller. Call center 40 will then retrieve the full caller account information from host 1 that will be downloaded to workstation 13. While these last two tasks are being performed, the live agent is already speaking to the caller through telephone 12.

If required, the live agent may transfer the caller to any of the previously described functions, including IVR 53, voice mail 52 and fax 58 in order to further service the caller's needs. Call center 40 contains the capability of perpetually transferring the caller to any of the functions within call center 40. As the call is transferred, caller account information is also transferred to the destination thus obviating the need to repeatedly ask the caller for the information.

Workstation 13 may be placed into a normal mode through workstation 504, architecture 57 and host interface 502 whereby workstation 13 interacts with host 14 in a normal host session. In this instance, phone 12 operates as a normal PBX extension. In a campaign mode, the live agent's workstation 13 and phone 12 are driven by an IVR script contained in call center 40. Once a live agent logs into workstation 13 in a campaign mode, call center 40 makes a telephone call through interface 503 to telephone 12 providing a permanent connection between call center 40 and telephone 12. The agent then stands by for transfers of caller callers to workstation 13 and phone 12.

Call center 40 also supports dialing outbound from caller lists using a pacing algorithm within predictive dialing module 55. In this process, predictive dialing module 55 begins dialing outbound over interface 501 to public network 10. As calls are answered, a call progress monitor within predictive dialing module 55 determines the status of the outgoing line such as ringing, busy signals, out-of-service signals and answers. This continues until a live caller is reached whereby predictive dialing module 55 determines the availability of any live agents attached to call center 40. If no live agents are available, the call may be transferred to IVR 53 to interact with the caller in the manner previously described. Or, the caller may be placed in an ACD queue within agent's module 56 that allows holding or selecting a call back when an agent is available or at a specific future time, as previously described.

If and when a live agent becomes available, call center 40 makes a voice connection to the live agent through architecture 57, interface 503 and phone 12. A data connection to the live agent is made through workstation interface 504 to workstation 13. As previously described, an IVR script within IVR 53 transfers a "short screen" of caller information to workstation 13 and requests the full record through host interface 502 from host 14 for subsequent transfer to workstation 13. The live agent may then interact with the caller and subsequently transfer the caller to any of the other function modules within call center 40. A live agent may also transfer a call to another live agent or supervisor through interface 503 and interface 504. The already retrieved data is then transferred to the new workstation where the audio portion of the call has been transferred.

Call center 40 also supports transferring calls to remote locations by selecting an outbound trunk line through interface 501 and dialing another location using a DNIS that activates an IVR script on the receiving end of the call. The caller's identification is passed to the receiving end IVR script, that, in turn, establishes a host session for a local agent. The initial call center's location then holds up the voice connection until the call is completed.

The call center supports two methods of providing PBX functionality to the agents. For small groups of up to 48 stations, 2,500 telephone instruments can be connected directly to the call center. Very basic PBX service is supported, including station-to-station calls, station-to-trunk calls, trunk-to-station calls and call transfers.

For larger groups, or where full-feature PBX support is required, the call center connects digitally via T1/E1 transmission lines to many popular PBX systems. When agents wish to enter a call center ACD group, they log on into a campaign and a connection is "mailed up" through the PBX, allowing the call center to control campaign call switching.

The call center supports digital connectivity to the telephone network via standard T1 transmission lines in the U.S. and E1 internationally. ISDN primary rate protocol is supported and is certified in many countries. Additionally, loop-start analog connections are supported.

Call center 40 also supports conferencing-in another agent or supervisor on a call, with voice, text and image data available to both operators.

Although the present invention and its advantages have been described in detail, it should be understood that various changes, substitutions and alterations can be made herein without departing from the spirit and scope of the invention as defined by the appended claims.

What is claimed is:

1. An integrated telephone call handling system adapted to be coupled to (1) a telephone network to enable said system to communicate via said network, (2) an agent workstation to enable an agent to communicate with said system and (3) an agent telephone to enable said agent to communicate with a party via said system and said network, said system comprising:

unified control means for controlling a call between said system and said party, said unified control means capable of (1) transferring said call among functional partitions within said system, said functional partitions providing mechanized communication via said network and (2) directing communications between said party and a selected one of said functional partitions, wherein said unified control means includes a unified script language operable to generate a voice script from inception to termination of said call, said voice script including a first script for directing interaction between said party and said system and a second script for directing interaction between said system and said agent.

2. The system as recited in claim 1 further comprising means for presenting information intended for delivery to a particular party to said particular party.

3. The system as recited in claim 2 wherein said means for presenting information intended for delivery to a particular party forms a portion of a mail system.

4. The system as recited in claim 1 further comprising means for presenting information to a party in a manner determined by said party.

5. The system as recited in claim 4 wherein said means for presenting information to a party in a manner determined by said party forms a portion of an interactive voice response system.

6. The system as recited in claim 1 further comprising means for presenting information to a party in a predetermined manner.

7. The system as recited in claim 6 wherein said means for presenting information to a party in a predetermined manner forms a portion of an audio text system.

8. The system as recited in claim 1 further comprising a dialer to thereby allow said system to place outbound calls to a third party.

9. The system as recited in claim 8 wherein said dialer is a predictive dialer.

10. The system as recited in claim 1 further comprising means for controlling an external PBX.

11. The system as recited in claim 1 wherein said unified control means resides within a common memory and is under control of a common processor, said unified control means capable of controlling said mechanized communication.

12. The system as recited in claim 1 wherein said system is adapted to interact with a host computer to thereby allow said system to retrieve data from a database within said host computer, said data employable in said communication with said party.

13. The system as recited in claim 12 wherein said system ms capable of displaying portions of said data to said agent.

14. The system as recited in claim 12 wherein said system is capable of transmitting portions of said data to said party.

15. The system as recited in claim 1 wherein said system is coupled to said network via a telephone line.

16. The system as recited in claim 1 further comprising:

means for creating a single record containing data gathered during said call; and means for storing data pertaining to said call in said single record throughout a duration of said call, said data gathered from said functional partitions within said system to thereby eliminate a need to gather a particular datum multiple times during said call.

17. The system as recited in claim 1 wherein said agent workstation is capable of displaying portions of said record to said agent.

18. An integrated telephone call handling system, comprising:

a telephone line coupling said system with a telephone network to thereby allow communication between said system and parties via said network;

a plurality of functional partitions within a common memory and under control of a common processor, said functional partitions capable of providing mechanized communication with said parties via said system and said network, said communication comprising data selected from the group consisting of: voice, text and image data;

a plurality of agent workstations and agent telephones coupled to said system, said workstations and telephones capable of providing communication between agents and said parties via said system and said network;

a unified controller within said system for controlling calls between said system and said parties, said unified controller (1) capable of transferring said calls among said functional partitions and agent workstations and telephones, (2) capable of directing communications between said parties and said functional partitions and (3) capable of directing communications between said system and said agent workstations and agent telephones, said unified controller including a unified script language operable to generate a voice script from inception to termination of said call, said voice script including a first script for directing interaction between said party and said functional partitions and a second script for directing interaction between said system and said agent.

19. The system as recited in claim 18 further comprising means for presenting information intended for delivery to a particular party to said particular party.

20. The system as recited in claim 19 wherein said means for presenting information intended for delivery to a particular party forms a portion of a mail system.

21. The system as recited in claim 18 further comprising means for presenting information to a party in a manner determined by said party.

22. The system as recited in claim 21 wherein said means for presenting information to a party in a manner determined by said party forms a portion of an interactive voice response system.

23. The system as recited in claim 18 further comprising means for presenting information to a party in a predetermined manner.

24. The system as recited in claim 23 wherein said means for presenting information to a party in a predetermined manner forms a portion of an audio text system.

25. The system as recited in claim 18 further comprising a dialer to thereby allow said system to place outbound calls to said third parties.

26. The system as recited in claim 25 wherein said dialer is a predictive dialer.

27. The system as recited in claim 18 further comprising means for means for controlling an external PBX.

28. The system as recited in claim 18 wherein said system is adapted to interact with a host computer to thereby allow said system to retrieve data from a database within said host computer, said data employable in said communication with said parties.

29. The system as recited in claim 28 wherein said system is capable of displaying portions of said data to said agents.

30. The system as recited in claim 28 wherein said system is capable of transmitting portions of said data to said parties.

31. The system as recited in claim 18 further comprising:

means for creating a single record containing data gathered during a particular call; and means for storing data pertaining to said call in said single record throughout a duration of said call, said data gathered from said functional partitions within said system to thereby eliminate a need to gather a particular datum multiple times during said call.

32. The system as recited in claim 18 wherein said agent workstation is capable of displaying portions of said record to said agent.

33. In a communications system having (1) an agent telephone and an agent workstation for enabling an agent to communicate with inquiring parties, (2) a database of information pertaining to accounts of said parties and (3) call completion capability for connecting calls to a plurality of different functional partitions within said system, said functional partitions including automated data response for obtaining information from a selected one of said accounts, a control unit for answering calls from said inquiring parties and for directing any of said calls to a selected one of said functional partitions comprising:

automated voice means including a first script controlling interactive communications with one of said parties to determine which functional partition is required and a second script for controlling interactive communications with said agent;

means for establishing a connection between a first functional partition and said one of said parties;

means for transferring to said first functional partition any data obtained with respect to said one of said parties;

means for continuing to monitor established communication connections to permit modification of said connection with said first functional partition when said one of said parties desires connection to a second functional partition; and means for transferring to said second functional partition said any data obtained with respect to said one of said parties.

34. The system as recited in claim 33 wherein said first functional partition is a data response and wherein said second functional partition is said agent, said system further including means, associated with said agent, for providing elected account information to said agent when said agent becomes connected to said one of said parties and wherein said automated voice means includes means for providing a preselected portion of said one of said parties' account data to said agent concurrent with said transferring to said agent, said preselected portion including a portion of said any data obtained with respect to said one of said parties.

35. The system as recited in claim 33 wherein said monitoring means further includes means for modifying a connection to a functional partition at a direction of said one of said parties.

36. The system as recited in claim 33 wherein said monitoring means further includes means for modifying a connection to a functional partition at a direction of any one of said functional partitions.

37. The system as recited in claim 33 further comprising:

means for creating a single record containing data gathered during a single call session; and means for storing data pertaining to said single call session in said single record throughout a duration of said call, said data gathered from said plurality of functional partitions within said system to thereby eliminate a need to gather a particular datum multiple times during said single call.

38. The system as recited in claim 33 wherein said database stores voice data.

39. The system as recited in claim 33 wherein said database stores text data.

40. The system as recited in claim 33 wherein said database stores image data.

41. The system as recited in claim 33 wherein said record contains information gathered from a caller.

42. The system as recited in claim 33 wherein said record contains information gathered from said functional partitions.

43. The system as recited in claim 33 further comprising means for cross-referencing single records to one another to thereby create a meta-record.

\* \* \* \* \*